(12) United States Patent
MacKarvich

(10) Patent No.: US 7,413,209 B2
(45) Date of Patent: Aug. 19, 2008

(54) BOAT TRAILER WITH SEGMENTED BUNK BOARDS HAVING LIFTING EDGES

(76) Inventor: Charles J. MacKarvich, 5901 Wheaton Dr., Atlanta, GA (US) 30336

( * ) Notice: Subject to any disclaimer, the term of this patent is extended or adjusted under 35 U.S.C. 154(b) by 384 days.

(21) Appl. No.: 11/336,106

(22) Filed: Jan. 20, 2006

(65) Prior Publication Data

US 2007/0170692 A1 Jul. 26, 2007

(51) Int. Cl.
*B60P 3/10* (2006.01)

(52) U.S. Cl. ............ 280/414.1; 280/43.11; 280/47.131; 280/638

(58) Field of Classification Search ............... 280/414.1, 280/43.11, 248, 47.131, 638
See application file for complete search history.

(56) References Cited

U.S. PATENT DOCUMENTS

| 4,869,034 | A | * | 9/1989 | Hammond ................... 52/184 |
| 4,895,387 | A | * | 1/1990 | Hawkins et al. ........... 280/414.1 |
| 5,002,299 | A | | 3/1991 | Firehammer et al. ........ 280/414 |
| 5,009,045 | A | * | 4/1991 | Yoder ........................... 52/177 |
| 5,961,139 | A | | 10/1999 | Nichols, II ................ 280/414.1 |
| 5,993,063 | A | | 11/1999 | Stewart ........................ 384/42 |
| 6,189,909 | B1 | | 2/2001 | Danchuk .................. 280/414.1 |
| 6,651,997 | B2 | | 11/2003 | Higginson ............... 280/414.1 |
| 6,830,410 | B2 | | 12/2004 | Davidson et al. ............... 405/3 |
| 6,962,370 | B2 | * | 11/2005 | Simpson ..................... 280/789 |
| 7,216,884 | B2 | * | 5/2007 | Weekes .................... 280/414.1 |
| 2003/0042704 | A1 | * | 3/2003 | Higginson ............... 280/414.1 |
| 2007/0001086 | A1 | * | 1/2007 | Vonderahe et al. .......... 248/687 |
| 2007/0045984 | A1 | * | 3/2007 | Remedios et al. ........ 280/414.1 |
| 2007/0187924 | A1 | * | 8/2007 | Warren ..................... 280/414.1 |

* cited by examiner

*Primary Examiner*—J. Allen Shriver
*Assistant Examiner*—Tashiana Adams
(74) *Attorney, Agent, or Firm*—Thomas, Kayden, Horstemeyer & Risley, LLP

(57) ABSTRACT

The boat trailer includes segmented bunk board covers, with the segments being of different lengths so that they can be combined to cover different lengths of bunk boards. The bearing surfaces of the bunk board covers include a series of oppositely sloped lifting edges that tend to lift the facing surface of the boat hull so that when the boat is tilted on the trailer, the lowermost surface of the boat hull tends to apply more weight to one of the bunk boards, so that the lower surface tends to be lifted by its bunk board.

13 Claims, 6 Drawing Sheets

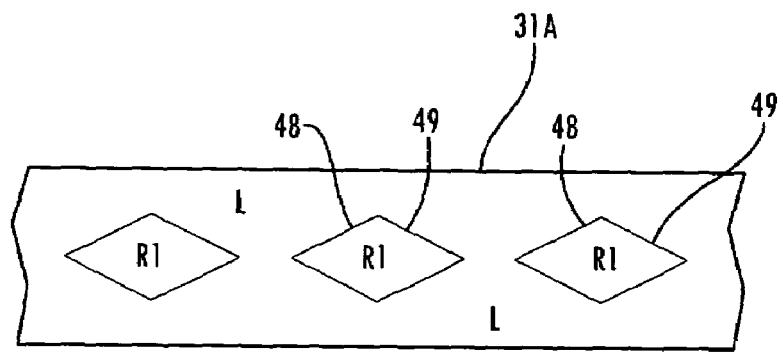
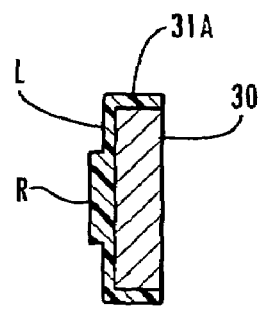
Fig. 6A
Fig. 6B
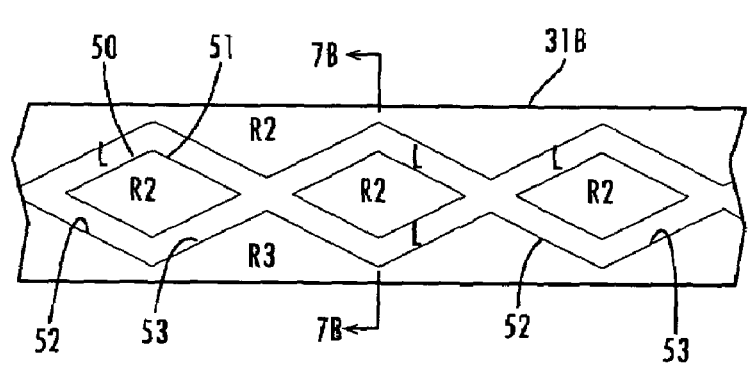
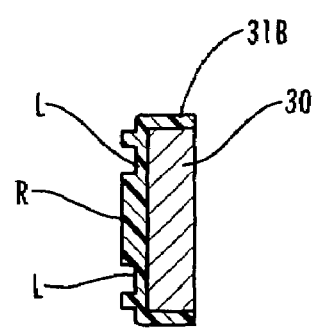
Fig. 7A
Fig. 7B
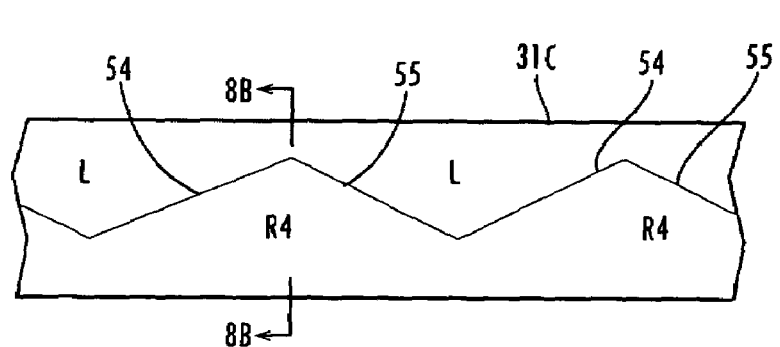
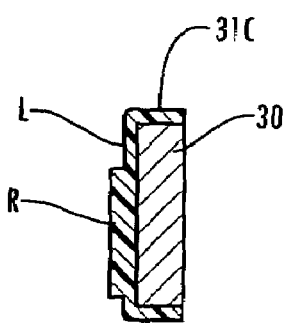
Fig. 8A
Fig. 8B

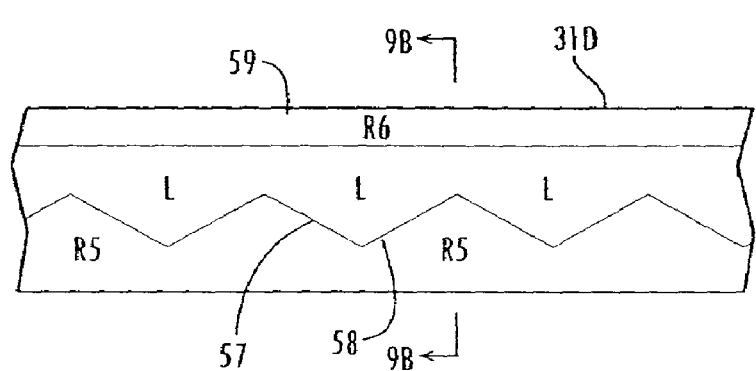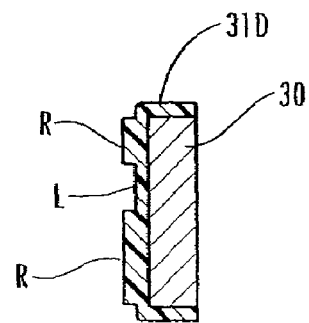
Fig. 9A  Fig. 9B
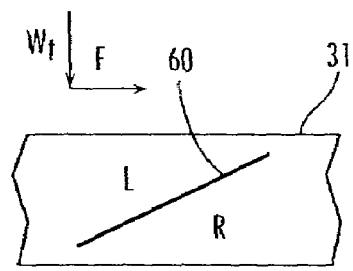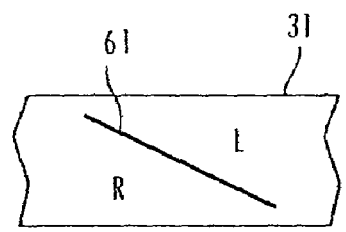
Fig. 10  Fig. 11

BOAT TRAILER WITH SEGMENTED BUNK BOARDS HAVING LIFTING EDGES

FIELD OF THE INVENTION

This invention concerns boat trailers for retrieving, transporting and launching boats. More particularly, the invention concerns bunk boards for boat trailers.

BACKGROUND OF THE INVENTION

Trailers that are used to haul boats over land usually include a frame mounted on wheels, a tongue extending forwardly from the frame that connects to a hitch ball of the towing vehicle, and parallel support boards, known as bunk boards, that are mounted to the frame. The trailer is backed down a boat launching ramp and a winch positioned over the tongue of the trailer is used to pull a boat from the water onto the bunk boards. The bunk boards are arranged so that their load bearing surfaces generally conform to the shape of the boat hull and are sometimes mounted on pivots so that they can tilt slightly to have their load bearing surfaces positioned in flat abutment with the curved hull of the boat.

There are occasions when a boat is being retrieved from the water onto the bunk boards of a boat trailer that the boat is not received in an upright attitude, with the boat slightly tilted to one side. In some instances, the boat will have a longitudinal rib on each side of its hull and the bunk boards are spaced apart so that they are likely to be engaged by a rib on the low side of the boat so that the boat is prevented from tilting too far to that side. However, some boats do not have the longitudinal ribs or the bunk boards of the trailer are not properly positioned for engagement with the ribs, and the tilting of the boat on the trailer is not corrected.

Bunk boards of trailers usually are made of support boards of rectangular cross section, such as 2"×4" wooden boards or boards of larger breadth. The wood or other material of the support boards is somewhat flexible and responsive to the weight of the boat as the boat is being retrieved or launched so as to spread the weight of the boat over the length of the bunk boards.

Usually, there is a relatively soft covering applied to the bearing surfaces of the boards, such as woven or tufted material that is superimposed between the boards and the hull of the boat. Typically, the material provides a softer and smoother surface than would be provided by the wood or other material of the boards beneath the material, thereby reducing the likelihood of abrasion between the support boards and the hull of the boat, and reducing the effort required to retrieve and launch the boat.

In some instances, the bunk board covers are molded or extruded of synthetic material, such as soft plastics that are formed to the shapes of the boards, so that they fit over the boards. The molded or extruded plastic bunk board covers usually provide a more slippery surface, particularly when wet, so as to enhance the ease of retrieving and launching a boat, and the plastic bunk board covers usually provide prolonged wear, reduce the likelihood of abrasion, and provide a clean and modem look to the boat trailer.

Bunk boards may be of different lengths on various trailers and/or for various boats, depending on the size, weight and shape of the boat and/or trailer. Because of the need for different length bunk boards, the bunk board covers must be provided in the requested lengths to fit the support boards, or the bunk board covers might be cut or molded to length to fit snugly on the different sizes of support boards. In some instances the bunk board covers leave the ends of the support boards exposed. The appearance of the exposed ends of the support boards is undesirable and it is desirable to have the ends of the support boards covered with the plastic bunk board covers so as to avoid contact between the boat hull and the ends of the bunk boards.

It is to the above noted problems that this invention is directed.

SUMMARY OF THE INVENTION

Briefly described, the present invention comprises a boat trailer for retrieving, transporting and launching a boat, including a pair of bunk boards for supporting a boat on a trailer. The bunk boards each include a load-bearing surface for mounting in a sloped attitude on the trailer and for engaging the facing sloped surface of a hull of a boat. A series of raised surfaces and lowered surfaces are formed along the length of the bearing surface of the bunk board with the raised surfaces defining lifting edges that extend above the lowered surfaces. The raised surfaces are shaped so that they form first and second oppositely sloped lifting edges. The first sloped lifting edges are oriented to lift the boat hull when the boat hull is advanced in a forward direction along the length of the bunk boards, as when the boat is being retrieved onto the trailer. The second oppositely sloped lifting edges are oriented to lift the boat hull when the boat hull is advanced in the opposite direction, as when launching the boat.

The bunk boards each may be formed of a support board, such as a wooden board of rectangular cross section, and a cover applied to the support board. The load-bearing surface is formed on the bunk board cover. It is also possible to provide a bunk board that is molded with the configured load bearing surface formed directly in the surface of the board and does not require a cover.

The covers of the bunk support boards may be formed of a high lubricity polymer.

The series of raised surfaces of the bunk boards that form the lifting edges may be of various configurations, including diamond shape, tooth shape, and other shapes that form oppositely sloped lifting edges. The lifting edges make frictional contact with the hull of the boat as the boat moves along the bunk boards when being retrieved or launched. The contact between the hull of the boat and the lifting edges of the bunk boards tends to apply a lifting force to the boat in response to the advancement of the boat along the bunk boards.

Another feature of the invention is that the bearing surfaces of the bunk boards are shaped so as to be able to function equally on either the right or the left bunk board of a boat trailer, so that the load-bearing surfaces of the same configuration of the bunk boards may be used for both bunk boards of the trailer.

Another feature of the invention is bunk board covers formed in segments of one foot, two feet, and three feet in length for mounting to support boards of different lengths, and at least some of the segments of the bunk board covers having connectors for connection to another of the segments in an end-to-end relationship.

Another feature of the invention may be that the bunk board assembly includes bunk board covers formed in segments that are molded to fit about a support board.

Still another feature of the invention may be that the bunk board covers are formed in segments and the segments are joined together when placed on a bunk board.

BRIEF DESCRIPTION OF THE DRAWINGS

FIGS. 6A, 7A, 8A and 9A are plan views of portions of bunk board covers, showing different shapes of the raised and lowered surfaces applied to the bunk board covers for carrying out the application of lifting forces to the hull of a boat as the hull is advanced along the lengths of the bunk board covers.

FIGS. 6B, 7B, 8B and 9B are cross sectional views of the bunk board covers of FIGS. 6A, 7A, 8A and 9A, respectively.

FIGS. 10 and 11 are force diagrams, illustrating how the lifting forces are applied to the hull of a boat by the shapes of the lifting edges of a bunk board.

DETAILED DESCRIPTION

Figure 1:
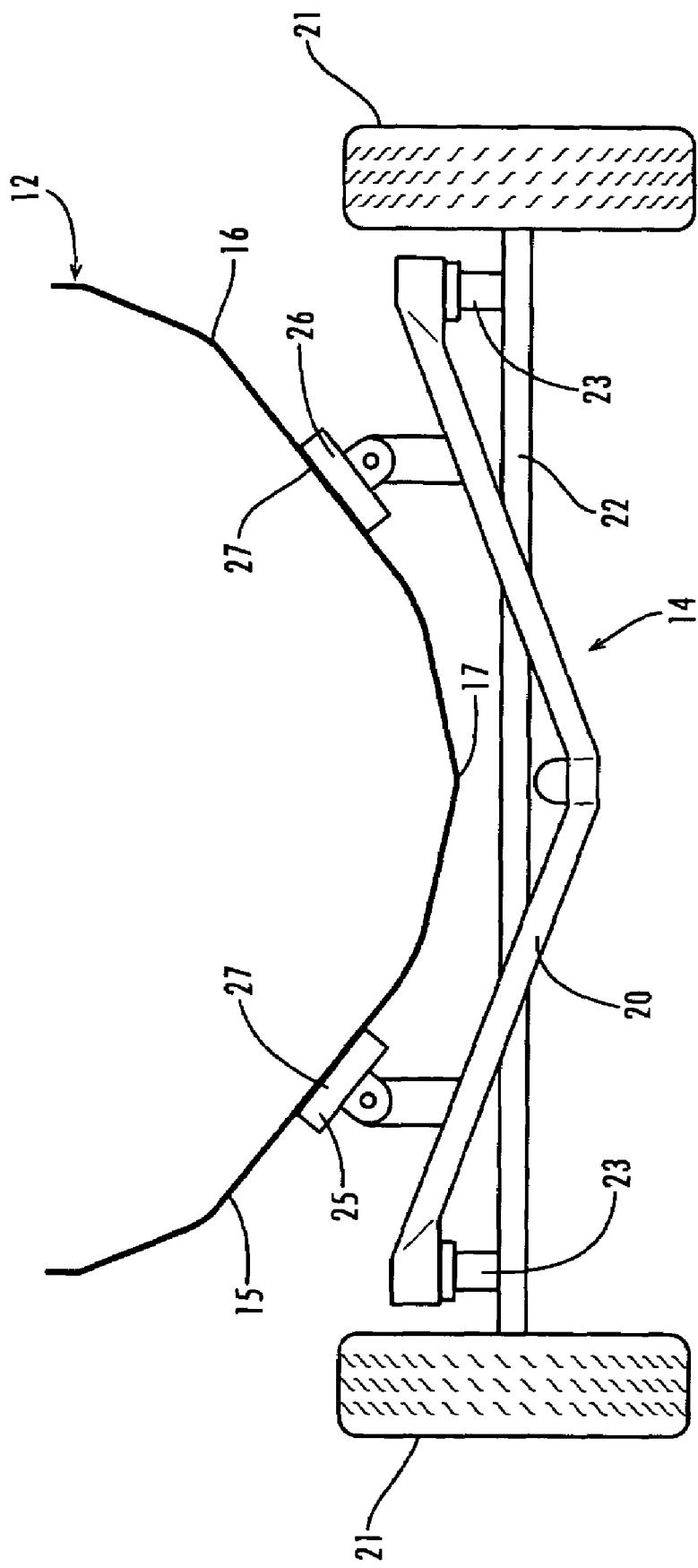
FIG. 1 is a front elevational view of a boat trailer with the shape of the boat hull shown mounted on the bunk boards of the trailer.

Referring now in more detail to the drawings, in which like numerals indicate like parts throughout the several views, FIG. 1 illustrates a boat hull 12 mounted on a boat trailer 14. The boat hull illustrated in the drawings is of conventional design in that it includes opposed sloped sides 15 and 16, with a keel 17.

Boat trailer 14 includes a frame 20, with wheels 21, axle 22, and suspension springs 23 supporting the frame 20 on the axle. Bunk boards 25 and 26 can be mounted rigid or pivotally mounted to the frame 20. The bearing surfaces 27 of the bunk boards are able to make substantially flat abutment with the facing surfaces of the sloped sides 15 and 16 of the boat hull due to the pivotal mounting or rigid alignment of the bunk boards. This is conventional in the art.

As shown in FIGS. 2-5, the bunk boards 25 and 26 are assemblies that include a support board 30 and a bunk board cover 31. The support board 30 is of rectangular cross section and includes a flat surface 32 sloped to face the slope of the boat hull and with the opposed surface not shown, opposed side surfaces 33 (only one shown), and opposed end surfaces 34 (only one shown). The dimensions of the support board 30 are selected for the size and the weight of the boat to be carried by the trailer. In some of the smaller trailers, the support board 30 can be formed of conventional two inch×four inch wood, but other sizes can be selected. Wooden support boards are preferred because wood provides a somewhat flexible shape that receives and tends to comply with the shape of the boat hull, thereby spreading the load of the boat hull over a large percentage of the bearing surface of the bunk board. However, other materials can be used for forming the support boards, as may be desired.

A bunk board cover 31 is sized to fit about the upper surface, opposed side surfaces and opposed end surfaces of the support board 30. Bunk board cover 31 is molded of plastic material, such as a high lubricity polymer. The bunk board cover has an upwardly facing loading bearing surface 36, opposed side skirts 38 and 39 (FIG. 4) that form a channel shape that is sized and shaped to snuggly fit about the upper surface and opposed side surfaces of the support board.

Figure 3:
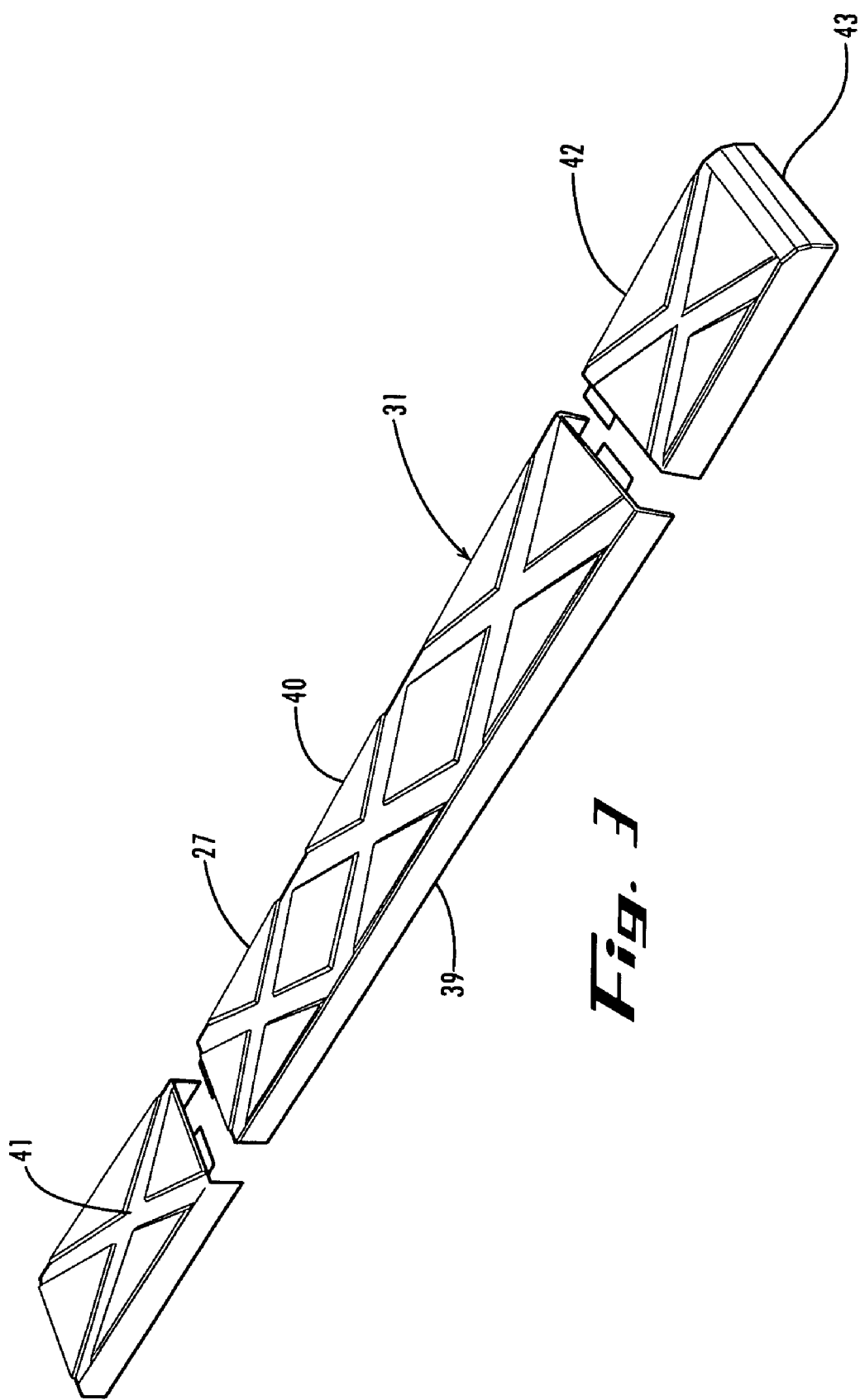
FIG. 3 is a perspective view of a segmented bunk board cover, with the segments displaced from one another to illustrate how they are connected together.

As shown in FIG. 3, the bunk board cover 31 is segmented, being formed of different sized segments. FIG. 3 shows a three feet long center segment 40 and a pair of one foot long end segments 41 and 42. Another segment (not shown) is a two feet segment. The one foot segments and two feet segments are formed with opposed side skirts 38 and 39 as well as an end skirt 43.

The combination of one-, two- and three foot segments allows bunk board covers to be assembled of multiple lengths of whole foot bunk board covers. For example, a three feet center segment joined with a pair of one foot end segments provides a bunk board cover of five feet in length. If a six feet length is desired, a one foot, two feet and three feet combination is used. If a seven feet length is desired, a three feet, and a pair of two feet segments are used, and so forth.

Figure 2:
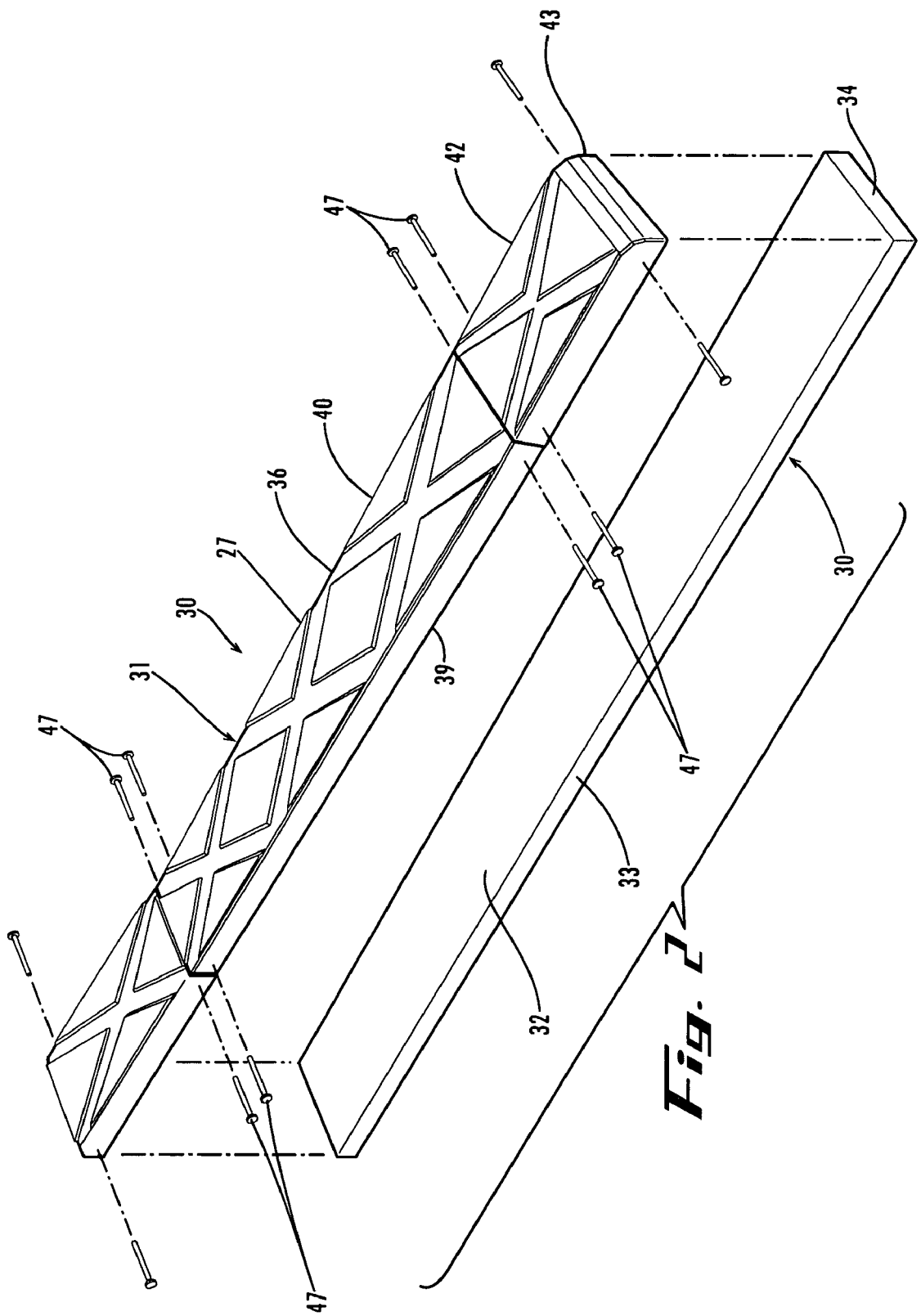
FIG. 2 is a perspective view of a bunk board cover and a support board with the bunk board cover being spaced away from the support board.
Figure 4:
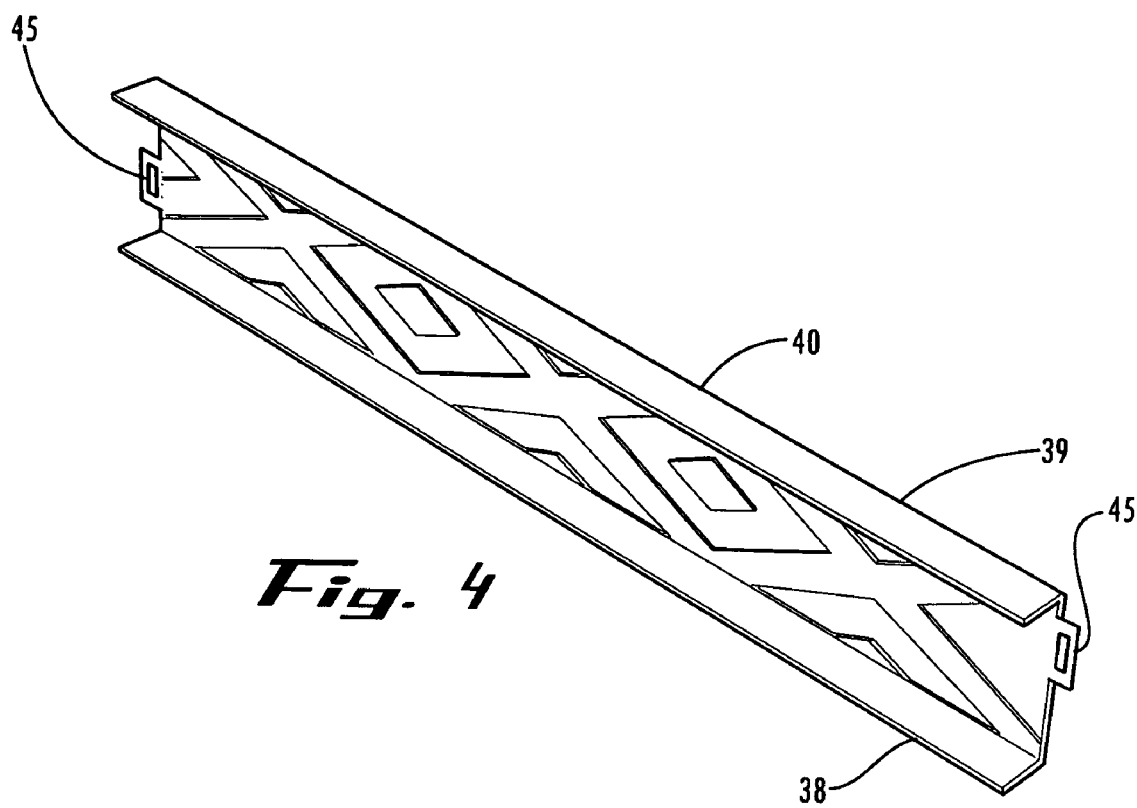
FIG. 4 is a perspective view of a bunk board cover segment turned on its side so as to expose its underside.
Figure 5:
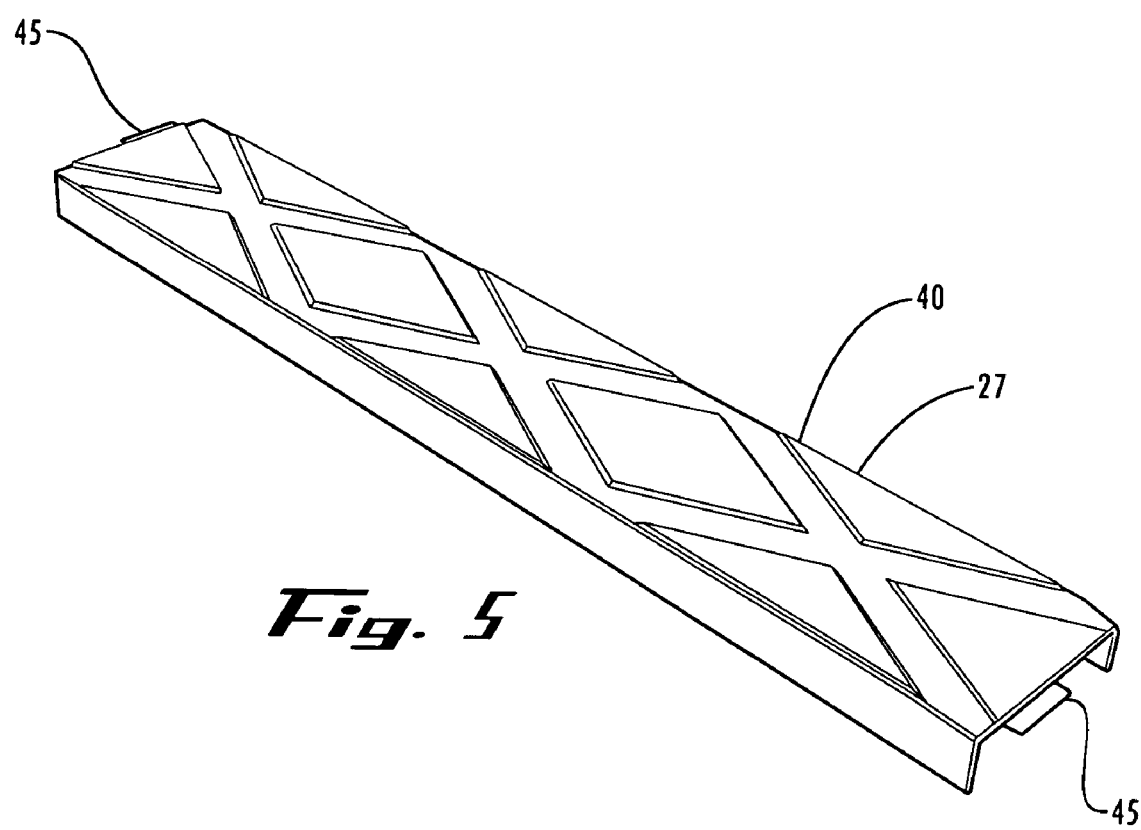
FIG. 5 is a perspective view of a bunk board cover segment, providing a more detailed illustration of the end edge of the segment.

As best shown in FIG. 4, the end edges of the segments that do not have a end skirt 43 are formed with connector tongues 45, with the connector tongues being offset to one side so as not to interfere with the connector tongue of an adjacent segment of the assembled bunk board cover. The connector tongues 45 slip beneath the surfaces of the adjacent bunk board cover and tend to hold the bearing surfaces of the bunk board covers in a common plane. The bunk board covers may be mounted on the support boards with fasteners, such as nails 47 that extend through the opposed side skirts, as shown in FIG. 2.

As shown in FIGS. 6A, 7A, 8A and 9A, the configuration of the bearing surfaces of the bunk boards can vary. Each configuration includes a raised surface R and a lowered surface L. The raised surfaces R are repeated along the length of the bunk board covers.

FIGS. 6A and 6B illustrate a bunk board cover 31A that includes diamond shaped raised areas R1 having oppositely sloped lifting edges 48 and 49 facing the lowered surfaces L. As shown in FIG. 1, the bunk board is tilted to match the slope of the hull of the boat. Due to the tilt of the bunk board the oppositely sloped lifting edges 48 and 49 shown in FIG. 6A face upwardly. When the boat is advanced along the bunk boards the facing surface of the boat hull will engage the upwardly sloped one of the oppositely sloped lifting edges 48 or 49 while passing over the other downwardly sloped lifting edge 49 or 48. This tends to lift the portion of the boat hull that engages the upwardly sloped lifting edge.

FIGS. 7A and 7B show another bearing surface configuration of a bunk board, with the raised surfaces R2 formed in the diamond shapes and with raised surfaces R3 formed in the matching saw tooth shapes. The edges of the raised surfaces R2 and R3 of the bunk board cover 31B are formed by oppositely sloped crossing channels L of the lowered surfaces. The oppositely sloped lifting edges 50 and 51 are formed on the edges of the diamond shaped raised surfaces R2, and the oppositely sloped lifting edges 52 and 53 are formed on the edges of the oppositely sloped saw toothed raised surfaces R3. The extra lifting edges 52 and 53 add more exposed lifting edges per unit of length of the bunk board cover.

FIGS. 8A and 8B include a raised surface R4 that is of saw-tooth configuration, forming adjacent the lowered surfaces L a series of oppositely sloped lifting edges 54 and 55.

FIGS. 9A and 9B show still another configuration of the bunk board cover, having its raised surfaces R5 forming oppositely sloped lifting edges 57 and 58. A raised border 59 is also used so as to stabilize the bunk board as it engages the sloped hull of the boat.

The raised lifting edges are formed in a repeat pattern along the lengths of the segments of the bunk board covers. As shown in FIG. 3, the designs formed on the bearing surfaces of the segments of the bunk board covers become aligned when the segments are put together in the connected end-to-end relationship, so that a continuous design configuration is achieved along the entire length of the bunk board covers.

As shown in FIGS. 10 and 11, a force diagram has a weight line designated "Wt." extending downwardly and the lateral force applied by the boat to the bunk board when the boat is advanced onto or off of a bunk board is indicated by "F." The sloped line 60 designates one of the sloped lifting edges of the bunk board cover, such as edge 60 of FIG. 7A, formed at the termination of the raised surface R adjacent the lowered surface L. Since the movement indicated by F along the length of the bunk board cover moves into the upwardly sloped lifting edge 60, the lifting edge tends to apply a lifting force to the hull of a boat, tending to lift the boat.

The portion of the boat hull that is moving across the downwardly sloped lifting edge 61 moves over the edge substantially without contacting it, so that the edge 61 does not tend to lift or lower the boat when the boat is moving in the direction indicated by the force arrow F. Therefore, no lifting force is applied to the boat hull by the downwardly sloped lifting edge 61.

The net result of both bunk board covers on opposite sides of the boat hull is that the heavier side of the boat when in a tilted configuration on a boat trailer tends to be lifted with more force than the opposite, lighter side of the boat until the boat becomes upright.

As shown in FIG. 11, when the boat is moved in the opposite direction along the lengths of the bunk boards, the sloped lifting edge 61 now is oriented upwardly with respect to the oncoming boat hull and tends to raise the boat, while the boat simply travels over the now downwardly sloped lifting edge 60. Therefore, the oppositely sloped lifting edges tend to right the boat if the boat is tilted and more weight is applied to one bunk board than to the other bunk board. When the boat has rolled and is tilted to one side, the lower side of the boat hull tends to bear more weight and, therefore, tends to apply more force to its bunk board, whereby the bunk board tends to right the boat.

Although preferred embodiments of the invention have been disclosed in detail herein, it will be obvious to those skilled in the art that variations and modifications of the disclosed embodiments can be made without departing from the spirit and scope of the invention as set forth in the following claims.

What is claimed is:

1. A boat trailer for retrieving, transporting and launching a boat, including a pair of bunk boards for supporting a boat on the trailer, the bunk boards each including:
   a load bearing surface for mounting in a sloped attitude for facing and engaging a sloped surface of a hull of the boat mounted on the trailer,
   the load bearing surface having a length for extending along the hull of the boat and a width,
   a series of alternate raised surfaces and lowered surfaces formed at spaced intervals along the length of the bearing surface with the raised surfaces each defining first and second oppositely sloped lifting edges extending diagonally across the length of the bearing surface,
   the first sloped lifting edges oriented to lift the boat hull when the boat hull is advanced in a first direction along the length of the bunk board and the second sloped lifting edges oriented to lift the boat hull when the boat hull is advanced in a second direction along the length of the bunk board.

2. The boat trailer of claim 1, wherein the bunk boards are each formed of a support board and a cover applied to the support board and forming the load bearing surface.

3. The boat trailer of claim 2, wherein the covers of the bunk boards are formed of a high lubricity polymer.

4. The boat trailer of claim 1, wherein the raised surfaces of the bunk boards include diamond-shaped raised surfaces.

5. The boat trailer of claim 1, wherein the raised surfaces of the bunk boards are diamond-shaped raised surfaces and that form exterior saw blade teeth-shaped raised surfaces.

6. The boat trailer of claim 1, wherein the series of raised surfaces of the bunk boards are formed by a series of teeth shapes that form the lifting edges that extend from the bunk board.

7. The boat trailer of claim 1, wherein the boat trailer includes a frame, wheels mounted to the frame, and the bunk boards pivotally mounted to the frame.

8. A bunk board having a bearing surface with a length and a width and the bearing surface sloped for engagement with the sloped surface of a boat hull, the bearing surface having a series of oppositely sloped lifting edges at spaced intervals extending diagonally across the length of the bearing surface of the bunk board that tend to lift the boat hull when the boat hull is advanced in either direction along the length of the boat hull in response to the boat hull applying its weight to the bunk board and advancing along the length of the bunk board.

9. The bunk board of claim 8 wherein the bunk board is formed of a support board and a bunk board cover, and the bearing surface is formed on the bunk board cover applied to the support board.

10. The bunk board of claim 8, wherein said bunk board cover is formed from segments of a bunk board cover, the segments formed in different lengths for mounting to the support board,
    at least some of the segments having connectors for connecting to another of the bunk board segments in end-to-end relationship.

11. The bunk board of claim 10 wherein at least one of the segments of the bunk board covers have an end portion that extends about an end of the support board.

12. The bunk board assembly of claim 10 wherein the bunk board covers are molded to fit about the support board.

13. A boat trailer having a pair of bunk boards having bunk board covers with load engaging surfaces for facing and engaging the sloped hull of a boat to be carried by the trailer,
    the load bearing surfaces of the bunk board covers including a series of pairs of oppositely sloped lifting edges formed at intervals along the length of the bearing surface with the raised surfaces each defining first and second oppositely sloped lifting edges extending diagonally across the length of the bearing surface and configured to lift the facing surface of the boat hull in response to the boat resting on the bunk boards and moving in either direction along the bunk boards,
    so that when the boat is tilted on the trailer, the downwardly tilted surface of the boat hull tends to apply more weight to its bunk boards, so that the downwardly tilted surface of the boat tends to be lifted by its bunk board.

* * * * *